United States Patent [19]
Inoue

[11] Patent Number: 6,050,229
[45] Date of Patent: Apr. 18, 2000

[54] TEMPERATURE SENSITIVE FAN DRIVE

[75] Inventor: Hiroshi Inoue, Shizuoka, Japan

[73] Assignee: Usui Kokusai Sangyo Kaisha, Ltd., Sunto-gun, Japan

[21] Appl. No.: 09/134,375

[22] Filed: Aug. 14, 1998

[30] Foreign Application Priority Data

Aug. 15, 1997 [JP] Japan ................................ 9-235367

[51] Int. Cl.[7] .............................. F01P 7/02; F16D 31/00
[52] U.S. Cl. ...................... 123/41.12; 192/82 T
[58] Field of Search ................ 123/41.12; 192/58 B, 192/82 T

[56] References Cited

U.S. PATENT DOCUMENTS

| | | | |
|---|---|---|---|
| 5,090,533 | 2/1992 | Inoue | 192/58.62 |
| 5,109,965 | 5/1992 | Inoue | 192/58.62 |
| 5,125,491 | 6/1992 | Takikawa et al. | 192/58.681 |
| 5,232,074 | 8/1993 | Watanabe | 192/58 |
| 5,452,782 | 9/1995 | Inoue | 192/58 |
| 5,501,183 | 3/1996 | Takayama | 123/41.12 |
| 5,881,857 | 3/1999 | Ryuu | 192/58.681 |

*Primary Examiner*—Noah P. Kamen
*Assistant Examiner*—Hai Huynh
*Attorney, Agent, or Firm*—Morgan, Lewis & Bockius LLP

[57] ABSTRACT

Oil recovery dams 24 and 25 are disposed on the side of the outer periphery of a drive disk 21 and in a torque transfer chamber 20. An oil circulating passage 26 guides oil from the side of the oil recovery dam 24 of the torque transfer chamber 20 to an oil reservoir chamber 19. A seal 27 is disposed between a drive shaft 11 and a hub 14 of the casing 12 with being appropriately outward separated from a bearing 15 in the axial direction of the drive shaft 11, and forms an oil supply chamber 28 defined by these components. An oil supply passage 29 guides the oil from the side of the oil recovery dam 25 of the torque transfer chamber 20 to the oil supply chamber 28.

14 Claims, 7 Drawing Sheets

TEMPERATURE SENSITIVE FAN DRIVE

BACKGROUND OF THE INVENTION

The present invention relates to a temperature sensitive fan drive which is called also a fan coupling, a fan clutch, a fan clutch drive, or a fan drive, and more particularly to a temperature sensitive fan drive which is used in a cooling fan that is disposed immediately behind a radiator and rotated by an engine, and that, even when an automobile is stopped and the vehicle wind is not expected, ventilates the radiator so as to ensure the heat radiation performance of the radiator. Such a fan drive controls the rotation of the fan in accordance with the temperature of the air.

A conventional temperature sensitive fan drive of such a kind is well-known by, for example, U.S. Pat. Nos. 5,232,074, 5,452,782, and 5,501,183, which has a structure in which a casing is rotatably supported on a drive shaft via a ball bearing or a needle bearing. Lubrication of the ball bearing or the needle bearing is performed by means of grease. When such a fan drive is used for a long term under severe conditions, therefore, there is a fear that seizure of the bearing occurs. In this way, the life of a bearing is affected by service conditions.

SUMMARY OF THE INVENTION

It is an object of the invention to provide a temperature sensitive fan drive in which a lubricating oil is forcedly supplied to a bearing, which is disposed between a drive shaft and a casing rotatably supported by the drive shaft, so as to cool and lubricate the bearing.

The above-mentioned object can be achieved by a temperature sensitive fan drive, according to the present invention, comprises:

a drive shaft coupled to a pulley shaft of an engine;

a casing having a hub portion rotatably supported on the drive shaft;

a bearing disposed between the drive shaft and the casing for rotatably supporting the hub portion relative to the drive shaft;

a cover sealingly attached to an opening end of the casing so as to define a space therebetween;

a partition plate for partitioning the space into an oil reservoir chamber and a torque transfer chamber, the partition plate having an oil flow control orifice for communicating the oil reservoir chamber with the torque transfer chamber;

a drive disk, fixedly supported on the drive shaft and allowed to rotate within the torque transfer chamber, for transmitting a torque from the drive shaft to the casing;

a valve plate fixedly mounted on the drive disk for opening and closing the oil flow control orifice;

temperature sensitive member being deflectable in accordance with an ambient temperature prevailing around the fan drive and being provided on the outside of the cover for driving said valve plate through a deflection thereof;

an oil circulating passage provided in the cover for communicating the torque transfer chamber with the oil reservoir chamber;

first oil recovery dam disposed within the torque transfer chamber in adjacent to an outer periphery of the drive disk for guiding an oil within the torque transfer chamber to an opened end of the oil circulating passage;

a sealing member disposed between the drive shaft and the hub and mounted to one of the drive shaft and the hub at a position apart from the bearing in an axial direction of the drive shaft so as to define an oil supply chamber between the sealing member and the bearing.

an oil supply passage provided in the casing for communicating the torque transfer chamber with the oil supply chamber; and a second oil recovery dam disposed within the torque transfer chamber in adjacent to an outer periphery of the drive disk for guiding an oil within the torque transfer chamber to an opened end of the oil supply chamber.

With the above-mentioned fan drive, part of the oil which is guided from the torque transfer chamber to the oil reservoir chamber via the oil circulating passage is guided from the torque transfer chamber to the oil supply chamber by the oil supply passage, thereby forcedly lubricating and cooling the bearing.

In addition, the above-mentioned construction of the fan drive according to the present invention, advantageously, the bearing is selected from the group essentially consisting of a sliding bearing, a needle bearing and a ball bearing.

With the above-mentioned fan drive, seizure of the bearing can be prevented from occurring without being affected by service conditions, the life of the bearing can be ensured so that the bearing can be used for a long term, and various kinds of bearings can be used. In particularly, when a sliding bearing is used, the production cost and the size can be reduced.

Further, the above-mentioned construction of the fan drive according to the present invention, advantageously, further comprises:

a bypass passage escapable the oil from an intermediate portion of the oil supply passage to the torque transfer chamber; and a relief valve disposed in the intermediate portion of the oil supply passage from which the bypass branches off.

With the above-mentioned fan drive, when the pressure of the oil supplied to the oil supply chamber exceeds a preset value, the relief valve allows part or all of the oil to escape into the torque transfer chamber via the bypass.

Furthermore, in the above-mentioned construction of the fan drive according to the present invention, advantageously, the drive disk has an outer peripheral surface which is coated with a wear-resistant material.

Moreover, in the above-mentioned construction of the fan drive according to the present invention, advantageously, the drive disk has an outer peripheral surface to which a facing is attached.

In addition, the above-mentioned construction of the fan drive according to the present invention, advantageously, further comprises:

a restriction disposed in the oil supply passage for restricting an oil rate.

In the above-mentioned fan drive, the restriction is, preferably, one of a constant restriction and a variable restriction.

With the above-mentioned fan drive, when the pressure of the oil flowing from the torque transfer chamber into the oil supply passage becomes high, the restriction adjusts the flow rate of the oil, thereby suppressing the oil which excessively flows into the oil supply chamber.

Further, in the above-mentioned construction of the fan drive according to the present invention, advantageously, the second oil recovery dam is disposed at a position radically closer to a rotation axis of the drive shaft than a position on which the first oil recovery dam is disposed.

With the above-mentioned fan drive, part of the oil which is guided from the side of first oil recovery dam of the torque transfer chamber to the oil reservoir chamber via the oil circulating passage is guided from the side of the second oil recovery dam of the torque transfer chamber to the oil supply chamber by the oil supply passage, thereby forcedly cooling the bearing.

According to the above-mentioned fan drive, seizure of the bearing can be prevented from occurring without being affected by service conditions, the life of the bearing can be ensured so that the bearing can be used for a long term, and various kinds of bearings can be used, and particularly a sliding bearing can be used, whereby the production cost and the size can be reduced.

DETAILED DESCRIPTION OF PREFERRED EMBODIMENTS

Figure 1:
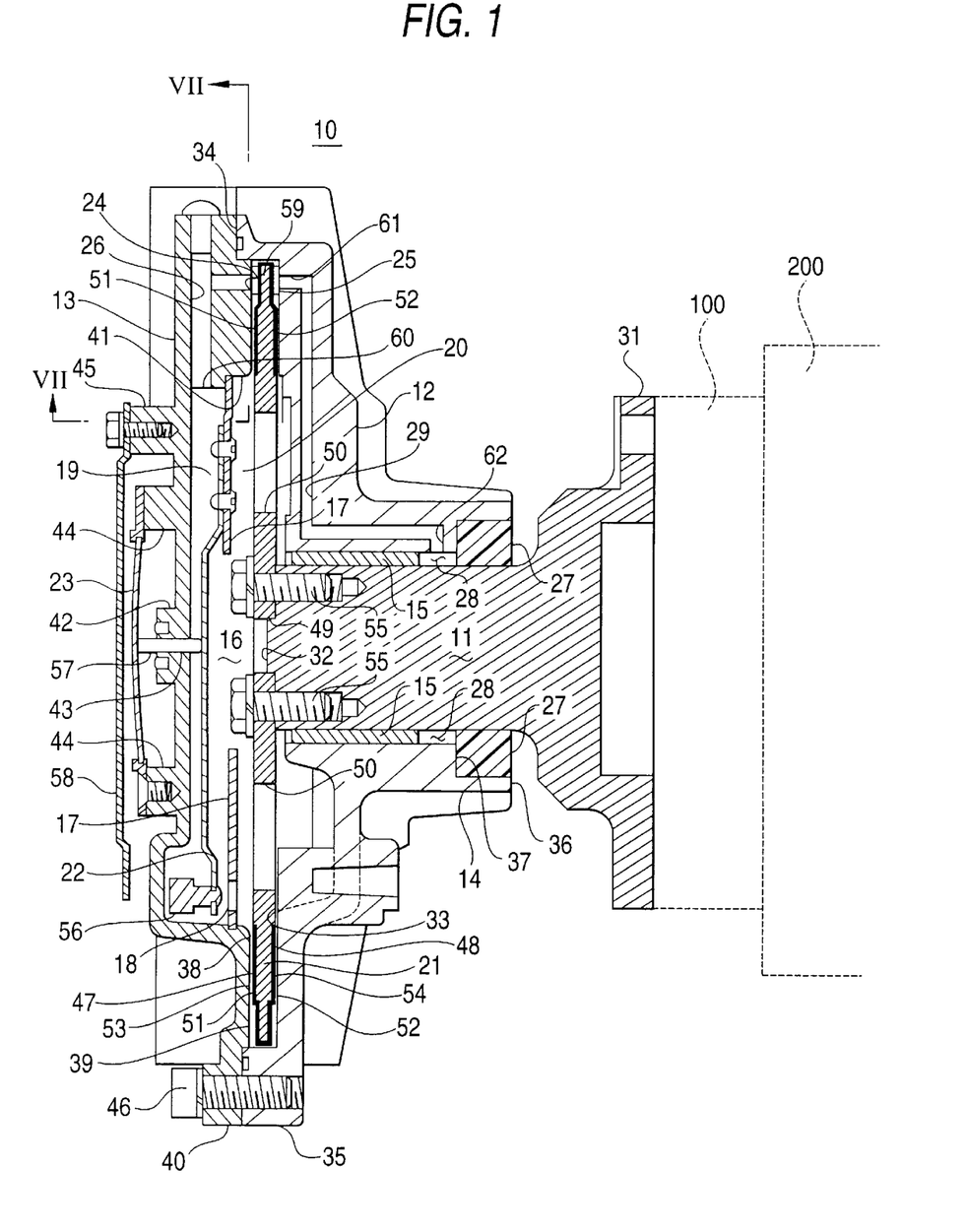
FIG. 1 is a section view of an embodiment of the temperature sensitive fan drive of the invention which is applied to a cooling fan that is used in a cooling system of an engine mounted on an automobile and that is rotated by the engine, and taken along the axial direction.
Figure 7A:
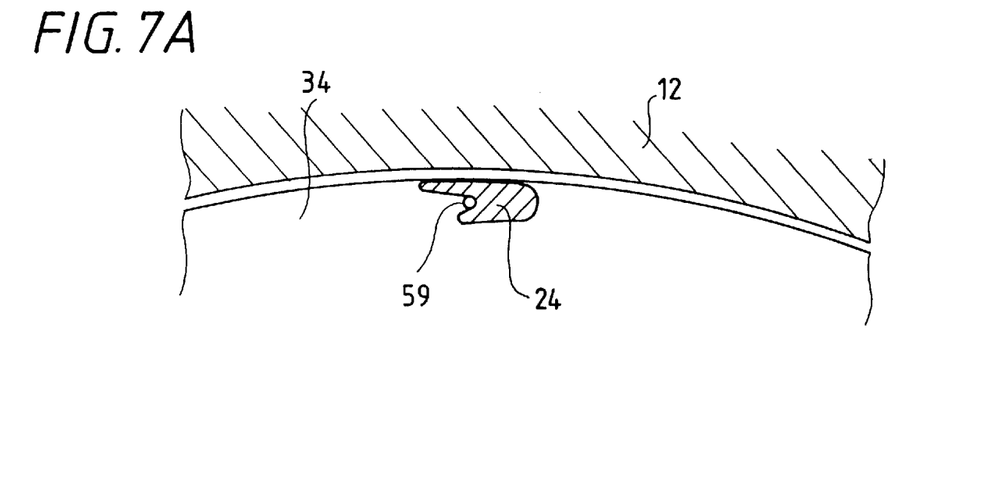
FIG. 7A shows a plane view, along a line VII—VII in FIG. 1, of an oil recovery dam of a side dam type which is applicable into the above-mentioned embodiments of the temperature sensitive fan drive of the invention.

Hereinafter, specified embodiments of the temperature sensitive fan drive of the invention will be described with reference to the accompanying drawings. FIG. 1 shows an embodiment 10 of the temperature sensitive fan drive of the invention which is applied to a cooling fan that is used in a cooling system of an engine mounted on an automobile and that is rotated by the engine. The temperature sensitive fan drive 10 is embodied in a structure wherein the drive comprises: a drive shaft 11 which is to be coupled to a pulley shaft 100 of the engine 200; a casing 12 in which a hub 14 is mounted onto the drive shaft 11 by means of a bearing 15, which is rotatably supported on the drive shaft 11, and in which a space 16 is formed by a cover 13 that is mounted under a seal to an opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; oil recovery dams 24 and 25 (so generally called as side dam as shown in FIG. 7A) which are disposed on a side of an outer periphery of the drive disk 21 and in the torque transfer chamber 20; an oil circulating passage 26 which guides oil from the side of the oil recovery dam 24 of the torque transfer chamber 20 to the oil reservoir chamber 19; a seal 27 which is disposed between the drive shaft 11 and the hub 14 with being appropriately outward separated from the bearing 15 in the axial direction of the drive shaft 11, and which forms an oil supply chamber 28 defined by these components; and an oil supply passage 29 which guides the oil from the side of the oil recovery dam 25 of the torque transfer chamber 20 to the oil supply chamber 28, in the casing 12.

The drive shaft 11 has a flange 31 at its root portion. On the other hand, the pulley shaft having a flange at its tip end is disposed in front of the engine. The flange 31 abuts against the flange of the pulley shaft, and is fastened by plural bolts and nuts to be coupled integrally to the tip end of the pulley shaft.

The casing 12 includes the cover 13 and is cast into a dish-like structure in which the hub 14 outward projects and a flange 35 outward projects from the outer periphery at the opening end 34. The cover 13 is butt-coupled to the opening end 34 to form the space 16 inside the casing. Integrally-molded fan blades (not shown) which constitute the cooling fan are screwed to the outer periphery of the casing. In the casing 12, a sliding bearing is used as the bearing 15, and the hub 14 is mounted onto the drive shaft 11 by means of the sliding bearing 15, so that the casing is rotatably supported on the drive shaft 11. The sliding bearing 15 is disposed closer to the tip end of the drive shaft 11, and the hub 14 is rotatably mounted onto the drive shaft 11. In the hub 14, a step is formed in an end face 36 which projects to the outside of the casing 12, so as to form a ring shoulder 37. The seal 27 is fitted into the ring shoulder 37.

Similarly, the cover 13 is cast into a dish-like structure in which a center boss 42, a pair of bimetal posts 44, and a bimetal cover post 45 outward project, and a flange 40 outward projects from the outer periphery at an opening end 39. The cover 13 is mounted integrally to the casing 12 by causing the opening end 39 to abut against the opening end 34 of the casing 12 under a seal, and fastening the flange 40 to the flange 35 of the casing 12 by plural bolts 46, thereby forming the space 16 inside the casing 12.

In the center boss 42, a guide bore 43 is opened in the axial direction of the drive shaft 11. In the center boss 42, a bush pin 57 is reciprocally slidably fitted into the guide bore 43 so as to be held thereby. The bush pin 57 is guided so as to be pressed against the valve 22. The pair of bimetal posts 44 outward project from the sides of the center boss 42 to the outside of the cover 13, with forming a predetermined gap between the posts, and support the ends of the temperature sensitive means 23. The bimetal cover post 45 projects to the outside of the cover 13, with being separated toward the outer periphery from one of the bimetal posts 44 by a predetermined gap, and supports a bimetal cover 58.

The partition plate 17 is formed into a ring disk. The oil flow control orifice 18 is opened in the vicinity of the outer periphery of the plate. The partition plate is fitted into a ring shoulder 41 which is formed by stepping the inner wall face 88 of the cover 13, and held by the cover 13, thereby partitioning the space 16 of the casing 12 into the oil reservoir chamber 19 and the torque transfer chamber 20.

In the drive disk 21, an alignment hole 49 is opened at the center. The alignment hole 49 is fitted onto a center joggle 32 which projects from the tip end face of the drive shaft 11, and the drive disk is fastened to the tip end face of the drive shaft 11 by plural bolts 55 so as to be supported on the drive shaft 11 and rotatable in the torque transfer chamber 20. In the drive disk 21, outer peripheral portions of disk faces 47 and 48 are coated with wear-resistant materials 51 and 52, respectively. As a result, the gap between the casing 12 and the cover 13 can be narrowed, and the drive disk 21 can efficiently transmit the torque to the casing 12. It is a matter of course that, in the drive disk 21, a facing may be attached to outer peripheral portions of the disk faces 47 and 48. In this case, the gaps between the drive disk 21 and the casing 12, and the drive disk 21 and the cover 13 are slightly widened as compared with those in the case of the wear-resistant materials 51 and 52. Plural large holes 50 are opened in the drive disk 21 so as to facilitate the return of the oil which has forcedly lubricated the sliding bearing 15, into the torque transfer chamber 20.

The valve 22 is made of a slim plate spring. The root portion in the outer peripheral side which is opposed to the oil flow control orifice 18 of the partition plate 17 is riveted to the side face of the oil reservoir chamber. The oil flow control orifice 18 is opened and closed by the tip end of the valve. In this case, the valve 22 has a valve head 56 at the tip end, and the valve head 56 is made remoter from or closer to the oil flow control orifice 18 by a centrifugal force, so as to open or close the oil flow control orifice 18, thereby adjusting the oil which is supplied from the oil reservoir chamber 19 to the torque transfer chamber 20.

The temperature sensitive means 23 uses a bimetal and is formed into a slim plate piece. The ends of the bimetal are supported by the pair of bimetal posts 44. The bimetal deflects in accordance with the temperature of the air which has passed through the radiator of the cooling system, to press the bush pin 57 against the valve 22, thereby opening or closing the valve 22. Specifically, when the temperature of the air is low, the bimetal deflects at a smaller degree, and hence the bush pin 57 is pressed against the valve 22 in opposition to the spring force of the valve 22, thereby causing the valve 22 to close the oil flow control orifice 18. When the temperature of the air becomes high, the bimetal 23 deflects at a larger degree, and hence the bush pin 57 is pressed back by the spring force of the valve 22, and the bimetal 23 causes the valve 22 to open the oil flow control orifice 18. In this way, the bimetal 23 causes the valve 22 to open or close the oil flow control orifice 18 in accordance with the temperature of the air, thereby adjusting the flow rate of the oil which is supplied from the oil reservoir chamber 19 to the torque transfer chamber 20. In accordance with the adjustment of the supplied oil amount, the torque which is transmitted from the drive disk 21 to the casing 12 is changed. The temperature sensitive means 23 may be produced by using a shape memorizing alloy.

The oil recovery dams 24 and 25 are disposed in gaps 53 and 54 formed in the vicinity of the outer periphery of the drive disk 21 and between the disk faces 47 and 48 of the drive disk 21 and the inner wall faces 33 and 38 of the torque transfer chamber 20. The oil recovery dams function at positions where the oil which is guided from the torque transfer chamber 20 to the oil reservoir chamber 19 via the oil circulating passage 26 is pressurized by the drive disk 21. In other words, the oil recovery dams 24 and 25 are so-called side dams, and, when the engine is operated, always cause the drive disk 21 to exert the pumping function. Particularly, the oil recovery dam 25 functions as a bearing oil dam.

In the oil circulating passage 26, an inlet 59 is closer to the side in front of the oil recovery dam 24 in the rotational direction and opened in the torque transfer chamber 20, and an outlet 60 is opened in the cover 13 to be opened in the oil reservoir chamber 19, so that the oil is guided from the front side of the oil recovery dam 24 in the torque transfer chamber 20 to the oil reservoir chamber 19. It is a matter of course that the oil circulating passage 26 may be formed by using a pipe. In this case, the pipe is cast into the cover 13 or laid outside the cover 13.

The seal 27 is fitted into the ring shoulder 37 of the hub 14, and seals the gap between the drive shaft 11 and the hub 14, whereby the oil supply chamber 28 is formed outside the sliding bearing 15 in the axial direction of the drive shaft 11 and between the drive shaft 11 and the hub 14.

In the oil supply passage 29, an inlet 61 is closer to the side in front of the bearing oil dam 25 in the rotational direction and opened in the torque transfer chamber 20, and an outlet 62 is opened in the oil supply chamber 28 to be opened in the casing 12, so that the oil is guided from the front side of the bearing oil dam 25 in the torque transfer chamber 20 to the oil supply chamber 28, thereby enabling the sliding bearing 15 to be forcedly lubricated. It is a matter of course that the oil supply passage 29 may be formed by using a pipe. In this case, the pipe is cast into the casing 12 or laid outside the casing 12.

Next, the operation which is performed by the above-described temperature sensitive fan drive 10 in accordance with the temperature of the air which has passed through the radiator of the cooling system, i.e., the operation which is called also the coupling operation or the clutch operation, and the forced lubrication of the sliding bearing 15 in the operation will be described. When the engine is operated, the drive shaft 11 is rotated by the pulley shaft, and, in accordance with the rotation, the drive disk 21 is rotated in the torque transfer chamber 20. When the temperature of the air is low, the valve 22 is caused by the bimetal 23 to close the oil flow control orifice 18, and the oil is not supplied from the oil reservoir chamber 19 to the torque transfer chamber 20. Consequently, the oil remaining in the torque transfer chamber 20 is reduced and a small torque is transmitted from the drive disk 21 to the casing 12. As a result, the cooling fan is rotated at a low speed.

In this case, part of the oil which is guided to the front side of the bearing oil dam 25 of the torque transfer chamber 20 is guided from the front side of the bearing oil dam 25 of the torque transfer chamber 20 to the oil supply chamber 28 via the oil supply passage 20, and then supplied from the oil supply chamber 28 to the sliding bearing 15 to forcedly lubricate the sliding bearing 15. Thereafter, the oil is returned to the torque transfer chamber 20.

When the temperature of the air becomes high, the bimetal 23 deflects at a larger degree, and the bush pin 57 is pressed back by the spring force of the valve 22 itself. Therefore, the valve 22 largely opens the oil flow control orifice 18, so that a larger amount of the oil is supplied from the oil reservoir chamber 19 to the torque transfer chamber 20. Consequently, the oil which exists in the torque transfer chamber 20 and contributes to the torque transmission is increased and a large torque is transmitted from the drive disk 21 to the casing 12. As a result, the cooling fan is rotated at a high speed.

In this case, part of the oil which is guided to the front side of the bearing oil dam 25 of the torque transfer chamber 20 is guided from the front side of the bearing oil dam 25 of the torque transfer chamber 20 to the oil supply chamber 28 via the oil supply passage 29, and then supplied from the oil supply chamber 28 to the sliding bearing 15 to forcedly lubricate the sliding bearing 15. Thereafter, the oil is returned to the torque transfer chamber 20.

Figure 2:
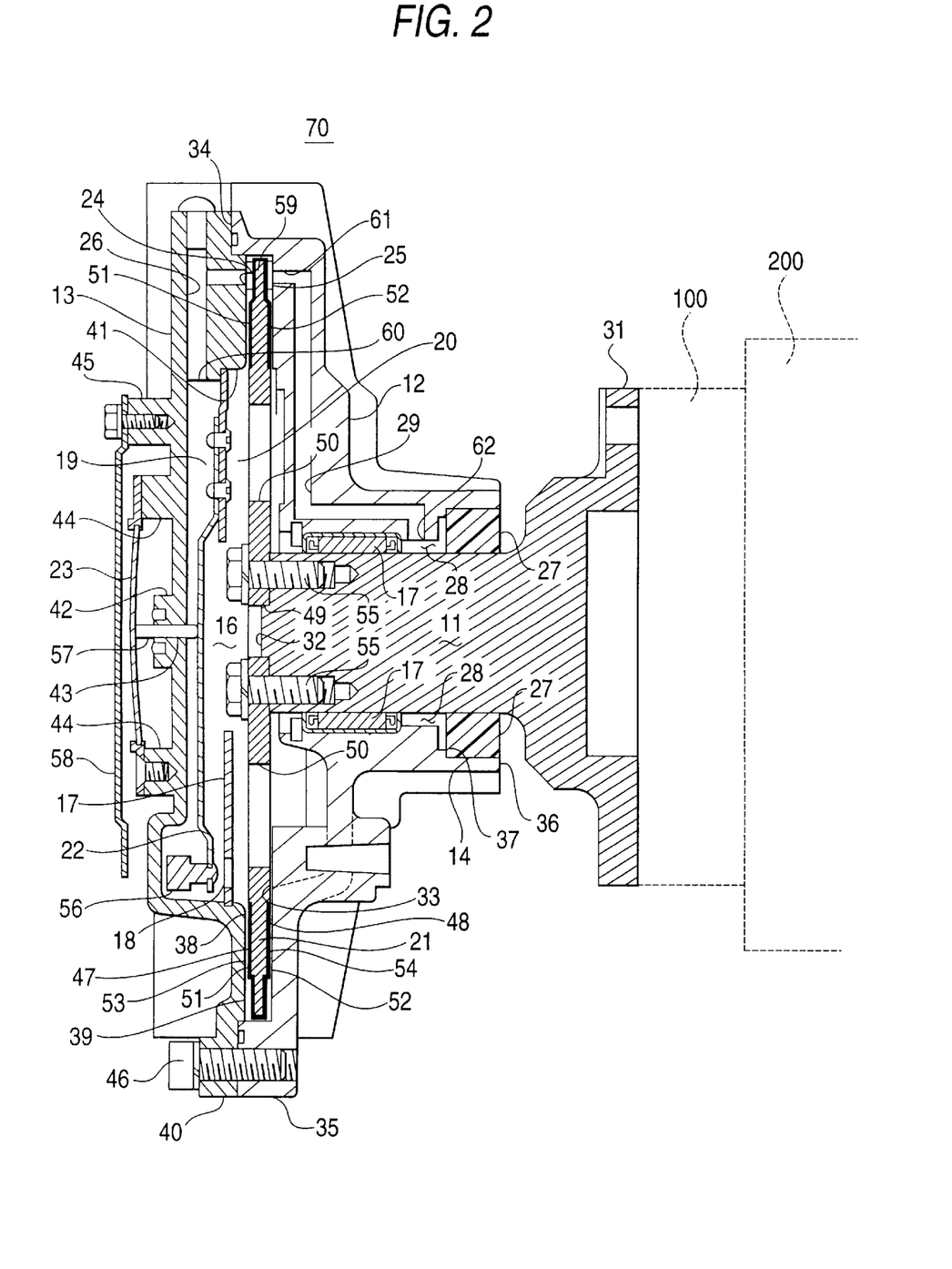
FIG. 2 is a section view of another embodiment of the temperature sensitive fan drive of the invention shown in FIG. 1, and taken along the axial direction.

FIG. 2 shows another embodiment 70 of the temperature sensitive fan drive of the invention which is applied to a cooling fan that is used in a cooling system of an engine mounted on an automobile and that is rotated by the engine. In the temperature sensitive fan drive 70, the sliding bearing 15 which is used as the bearing 15 in the above-described temperature sensitive fan drive 10 is replaced with a needle bearing 71.

Specifically, the temperature sensitive fan drive 70 is embodied in a structure wherein the drive comprises: a drive shaft 11 which is to be coupled to the pulley shaft of the engine; a casing 12 in which the hub 14 is mounted onto the drive shaft 11 by means of the needle bearing 71, which is rotatably supported on the drive shaft 11, and in which a space 16 is formed by a cover 13 that is mounted under a seal to the opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; oil recovery dams 24 and 25 which are disposed on a side of an outer periphery of the drive disk 21 and in the torque transfer chamber 20; an oil circulating passage 26 which guides oil from the side of the oil recovery dam 24 of the torque transfer chamber 20 to the oil reservoir chamber 19; a seal 27 which is disposed between the drive shaft 11 and the hub 14 with being appropriately outward separated from the needle bearing 71 in the axial direction of the drive shaft 11, and which forms an oil supply chamber 28 defined by these components; and an oil supply passage 29 which guides the oil from the side of the bearing oil dam 25 of the torque transfer chamber 20 to the oil supply chamber 28, in the casing 12.

The components of the temperature sensitive fan drive 70 are designated by the same reference numerals of the temperature sensitive fan drive 10 shown in FIG. 1 and their detailed description is omitted. It is a matter of course that the needle bearing 71 is forcedly lubricated in the same manner as the above-described sliding bearing 15.

Figure 3:
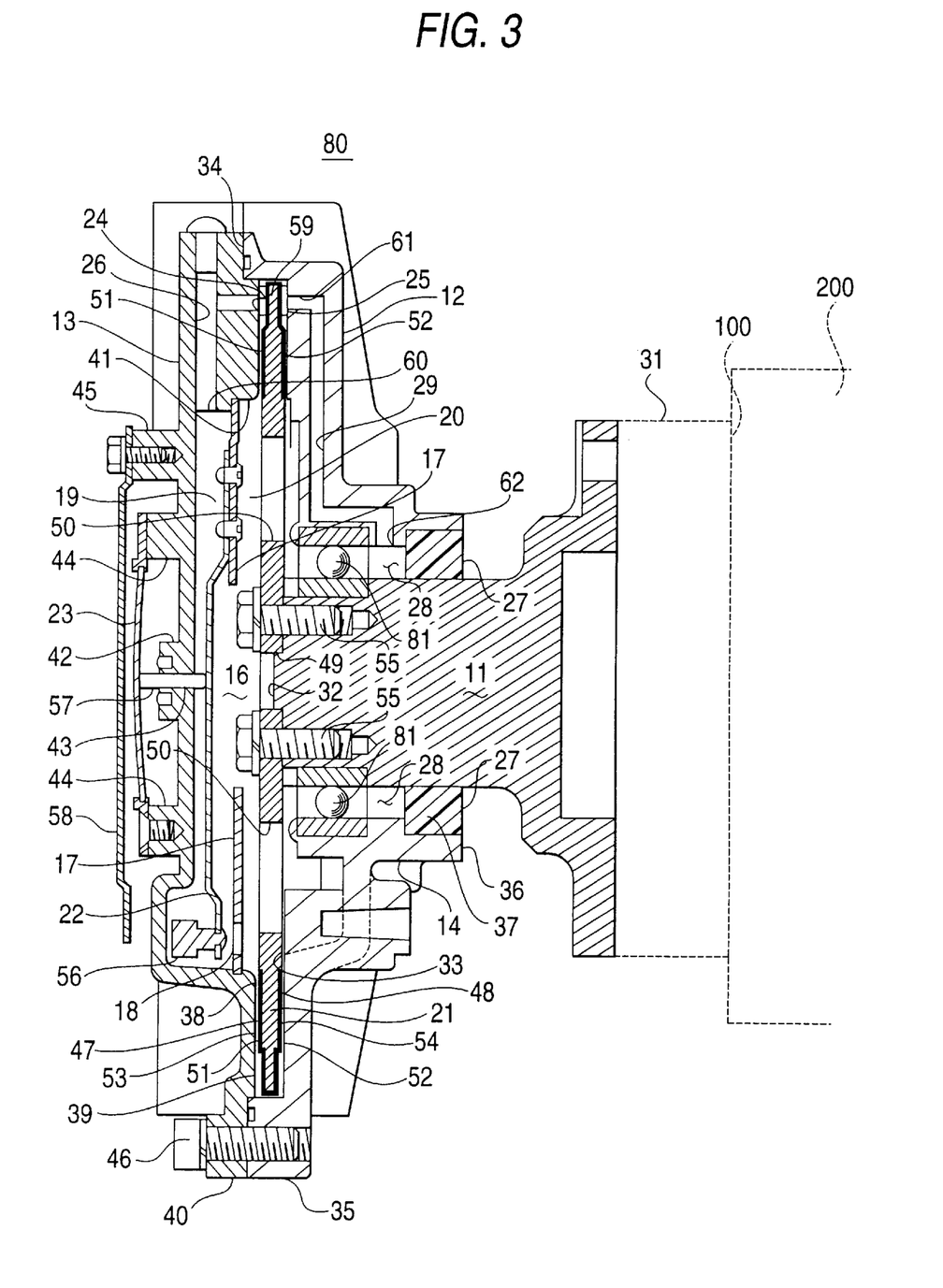
FIG. 3 is a section view of a further embodiment of the temperature sensitive fan drive of the invention shown in FIG. 1, and taken along the axial direction.

FIG. 3 shows a further embodiment 80 of the temperature sensitive fan drive of the invention which is applied to a cooling fan that is used in a cooling system of an engine mounted on an automobile and that is rotated by the engine. In the temperature sensitive fan drive 80, the sliding bearing 15 which is used as the bearing 15 in the above-described temperature sensitive fan drive 10 is replaced with a ball bearing 81.

Specifically, the temperature sensitive fan drive 80 is embodied in a structure wherein the drive comprises: a drive shaft 11 which is to be coupled to the pulley shaft of the engine; a casing 12 in which the hub 14 is mounted onto the drive shaft 11 by means of the ball bearing 81, which is rotatably supported on the drive shaft 11, and in which a space 16 is formed by a cover 13 that is mounted under a seal to the opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; oil recovery dams 24 and 25 which are disposed on a side of an outer periphery of the drive disk 21 and in the torque transfer chamber 20; an oil circulating passage 26 which guides oil from the side of the oil recovery dam 24 of the torque transfer chamber 20 to the oil reservoir chamber 19; a seal 27 which is disposed between the drive shaft 11 and the hub 14 with being appropriately outward separated from the ball bearing 81 in the axial direction of the drive shaft 11, and which forms an oil supply chamber 28 defined by these components; and an oil supply passage 29 which guides the oil from the side of the bearing oil dam 25 of the torque transfer chamber 20 to the oil supply chamber 28, in the casing 12.

The components of the temperature sensitive fan drive 80 are designated by the same reference numerals of the temperature sensitive fan drive 10 shown in FIG. 1 and their detailed description is omitted. It is a matter of course that the ball bearing 81 is forcedly lubricated in the same manner as the above-described sliding bearing 15.

Figure 4:
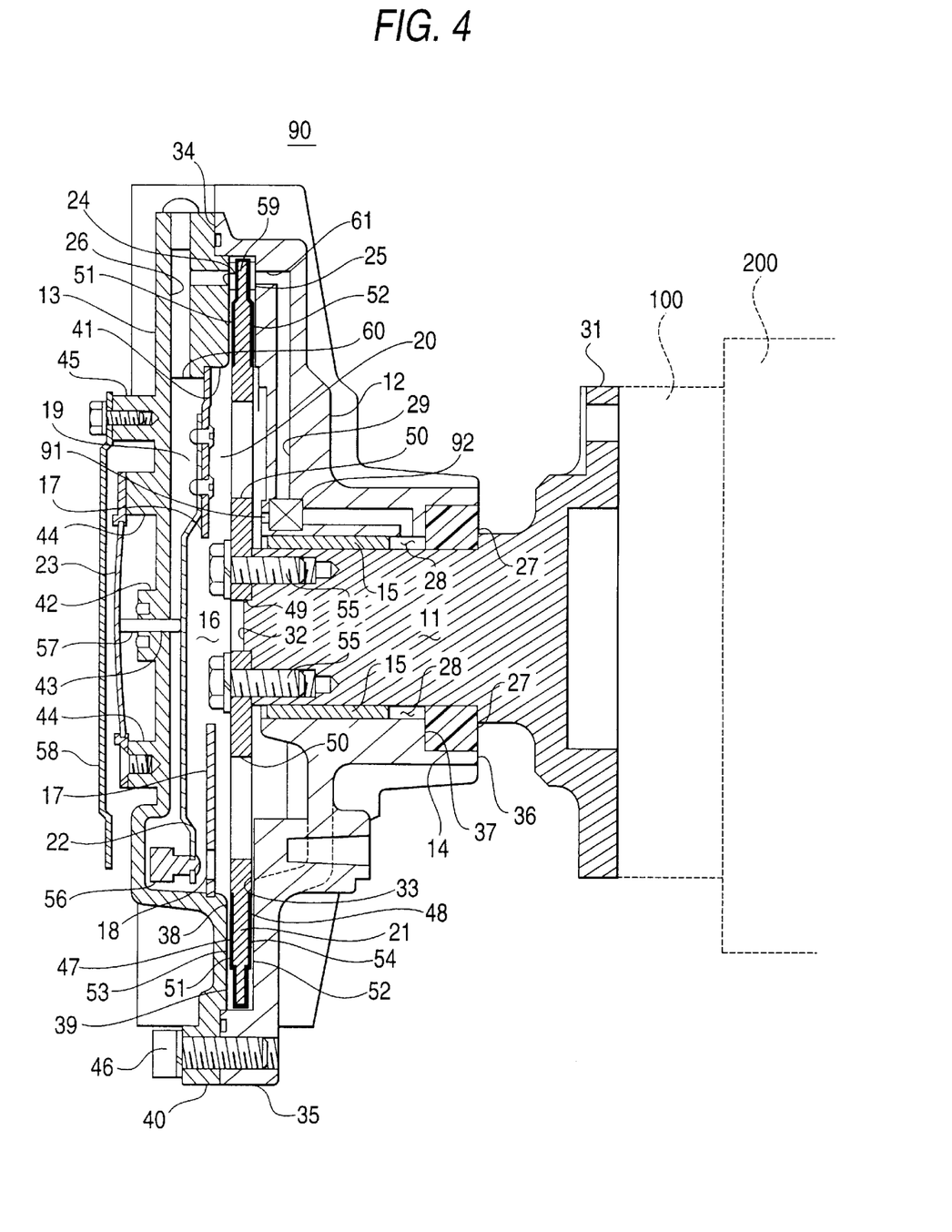
FIG. 4 is a section view of an embodiment of the temperature sensitive fan drive of the invention which is applied to a cooling fan that is used in a cooling system of an engine mounted on an automobile and that is rotated by the engine, and taken along the axial direction.

FIG. 4 shows an embodiment 90 of the temperature sensitive fan drive of the invention which is applied to a cooling fan that is used in a cooling system of an engine mounted on an automobile and that is rotated by the engine. In the temperature sensitive fan drive 90, a bypass 91 and a relief valve 92 are added to the above-described temperature sensitive fan drive 10. The bypass 91 is a bearing bypass. When the pressure of the oil which lubricates the bearing 15 reaches a preset value, the relief valve 92 allows part or all of the oil to escape to the return side, thereby limiting the pressure of the oil to the preset value or less.

Specifically, the temperature sensitive fan drive 90 is embodied in a structure wherein the drive comprises: a drive shaft 11 which is to be coupled to the pulley shaft of the engine; a casing 12 in which a hub 14 is mounted onto the drive shaft 11 by means of a bearing 15, which is rotatably supported on the drive shaft 11, and in which a space 16 is formed by a cover 13 that is mounted under a seal to an opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; oil recovery dams 24 and 25 which are disposed on a side of an outer periphery of the drive disk 21 and in the torque transfer chamber 20; an oil circulating passage 26 which guides oil from the side of the oil recovery dam 24 of the torque transfer chamber 20 to the oil reservoir chamber 19; a seal 27 which is disposed between the drive shaft 11 and the hub 14 with being appropriately outward separated from the bearing 15 in the axial direction of the drive shaft 11, and which forms an oil supply chamber 28 defined by these components; an oil supply passage 29 which guides the oil from the side of the bearing oil dam 25 of the torque transfer chamber 20 to the oil supply chamber 28, in the casing 12; the bypass 91 which, in the casing 12, allows the oil to escape from an intermediate portion of the oil supply passage 29 to the torque transfer chamber 20; and the relief valve 92 which is disposed in the portion of the oil supply passage 29 from which the bypass 91 branches off. As the bearing 15, a sliding bearing is used. It is a matter of course that the sliding bearing 15 may be replaced with the needle bearing 71, the ball bearing 81, or the like.

The components of the temperature sensitive fan drive 90 are designated by the same reference numerals of the temperature sensitive fan drive 10 shown in FIG. 1 and their detailed description is omitted. It is a matter of course that, in the temperature sensitive fan drive 90, part of the oil which is guided from the front side of the oil recovery dam 24 of the torque transfer chamber 20 to the oil reservoir chamber 19 via the oil circulating passage 26 is guided from the front side of the bearing oil dam 25 of the torque transfer chamber 20 to the oil supply chamber 28 via the oil supply passage 29 to forcedly lubricate the sliding bearing 15. In the temperature sensitive fan drive 90, when the pressure of the oil supplied to the oil supply chamber 28 exceeds a preset value, the relief valve 92 allows part or all of the oil to escape to the torque transfer chamber 20 via the bypass 91, whereby excessive forced lubrication of the sliding bearing 15 is suppressed and the seal 27 is protected.

Figure 5:
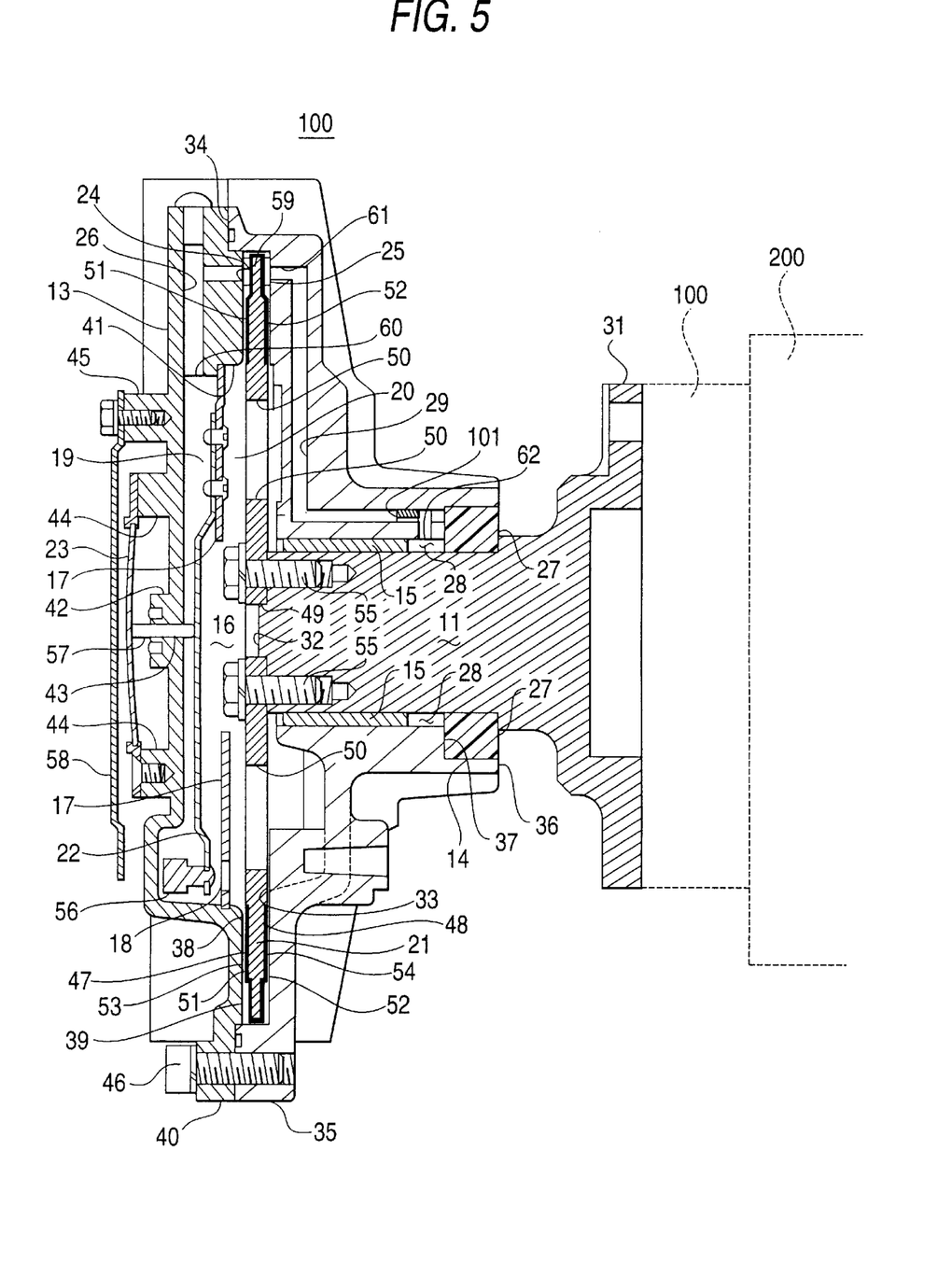
FIG. 5 is a section view of an embodiment of the temperature sensitive fan drive of the invention which is applied to a cooling fan that is used in a cooling system of an engine mounted on an automobile and that is rotated by the engine, and taken along the axial direction.

FIG. 5 shows an embodiment 100 of the temperature sensitive fan drive of the invention which is applied to a cooling fan that is used in a cooling system of an engine mounted on an automobile and that is rotated by the engine. In the temperature sensitive fan drive 100, a restriction 101 is added to the above-described temperature sensitive fan drive 10. When the pressure of the oil which flows from the front side of the bearing oil dam 25 of the torque transfer chamber 20 into the oil supply chamber 28 via the oil supply passage 29 is raised, the restriction 101 adjusts the flow rate of the oil, thereby suppressing the excessive flow of the oil.

Specifically, the temperature sensitive fan drive 100 is embodied in a structure wherein the drive comprises: a drive shaft 11 which is to be coupled to the pulley shaft of the engine; a casing 12 in which the hub 14 is mounted onto the drive shaft 11 by means of the needle bearing 71, which is rotatably supported on the drive shaft 11, and in which a space 16 is formed by a cover 13 that is mounted under a seal to the opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; oil recovery dams 24 and 25 which are disposed on a side of an outer periphery of the drive disk 21 and in the torque transfer chamber 20; an oil circulating passage 26 which guides oil from the side of the oil recovery dam 24 of the torque transfer chamber 20 to the oil reservoir chamber 19; a seal 27 which is disposed between the drive shaft 11 and the hub 14 with being appropriately outward separated from the needle bearing 71 in the axial direction of the drive shaft 11, and which forms an oil supply chamber 28 defined by these components; an oil supply passage 29 which guides the oil from the side of the bearing oil dam 25 of the torque transfer chamber 20 to the oil supply chamber 28, in the casing 12; and the restriction 101 disposed in the oil supply passage 29. As the bearing 15, a sliding bearing is used. It is a matter of course that the sliding bearing 15 may be replaced with the needle bearing 71, the ball bearing 81, or the like.

The components of the temperature sensitive fan drive 100 are designated by the same reference numerals of the temperature sensitive fan drive 10 shown in FIG. 1 and their detailed description is omitted. It is a matter of course that, in the temperature sensitive fan drive 100, part of the oil which is guided from the front side of the oil recovery dam 24 of the torque transfer chamber 20 to the oil reservoir chamber 19 via the oil circulating passage 26 is guided from the front side of the bearing oil dam 25 of the torque transfer chamber 20 to the oil supply chamber 28 via the oil supply passage 29 to forcedly lubricate the sliding bearing 15. In the temperature sensitive fan drive 100, when the pressure of the oil supplied to the oil supply chamber 28 is raised, the restriction 101 adjusts the flow rate of the oil, thereby suppressing the excessive flow of the oil into the oil supply chamber 28. As a result, excessive forced lubrication of the sliding bearing 15 is suppressed and the seal 27 is protected. As the restriction 101, a fixed restriction or a variable restriction may be used.

Figure 6:
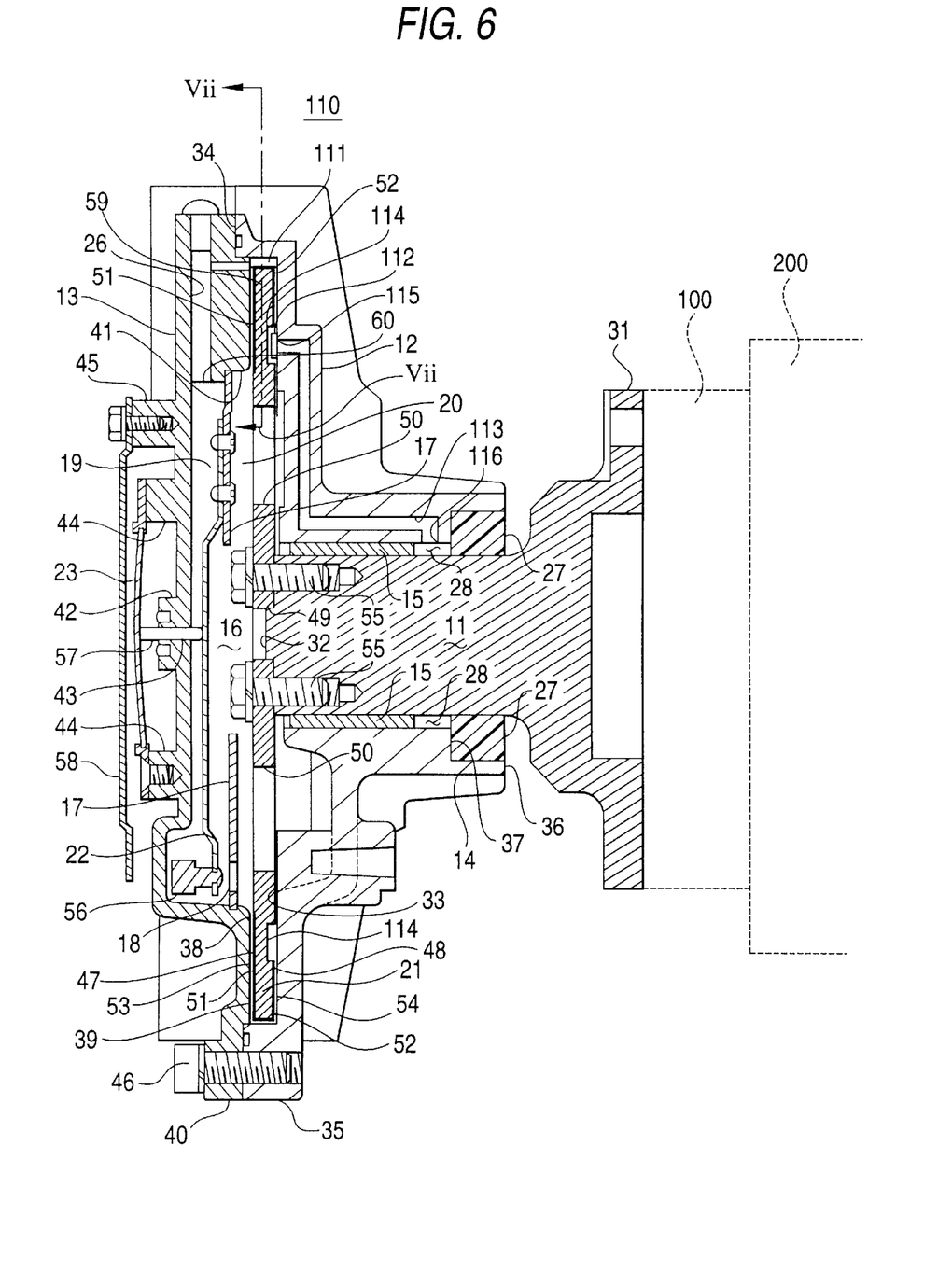
FIG. 6 is a section view of an embodiment of the temperature sensitive fan drive of the invention which is applied to a cooling fan that is used in a cooling system of an engine mounted on an automobile and that is rotated by the engine, and taken along the axial direction.
Figure 7B:
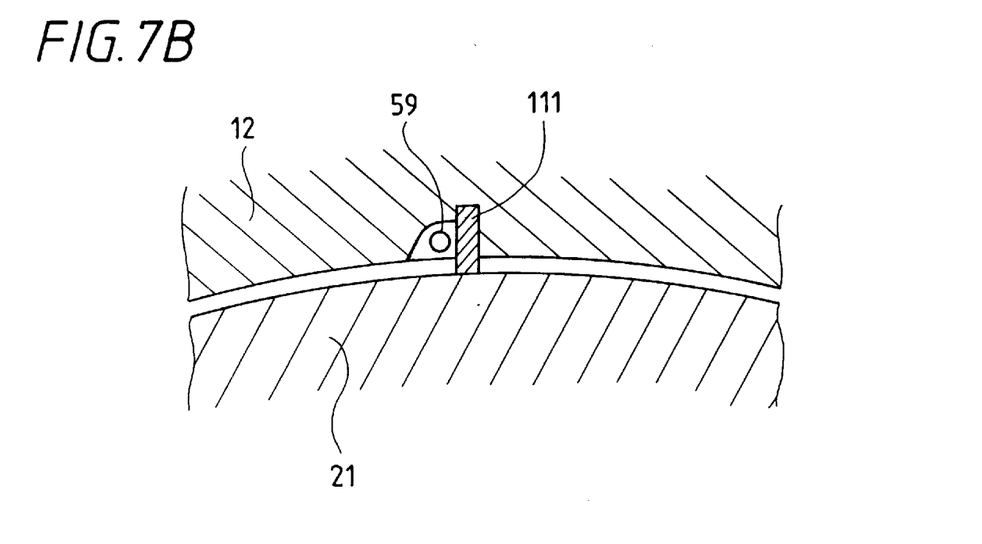
FIG. 7B shows a plane view, along a line Vii—Vii in FIG. 6, of an oil recovery dam of a outer dam type which is applicable into the above-mentioned embodiments of the temperature sensitive fan drive of the invention.

FIG. 6 shows an embodiment 110 of the temperature sensitive fan drive of the invention which is applied to a cooling fan that is used in a cooling system of an engine mounted on an automobile and that is rotated by the engine. In the temperature sensitive fan drive 110, an outer periphery dam 111 (so generally called as an outer dam as shown in FIG. 7B), an inner periphery dam 112 (of a generally called side dam type as shown in FIG. 7A), and an oil supply passage 113 are used in place of the oil recovery dams 24 and 25 and the oil supply passage 29 of the above-described temperature sensitive fan drive 10 of the invention.

Specifically, the temperature sensitive fan drive 110 is embodied in a structure wherein the drive comprises: a drive shaft 11 which is to be coupled to the pulley shaft of the engine; a casing 12 in which the hub 14 is mounted onto the drive shaft 11 by means of the needle bearing 71, which is rotatably supported on the drive shaft 11, and in which a space 16 is formed by a cover 13 that is mounted under a seal to the opening end 34; a partition plate 17 in which an oil flow control orifice 18 is opened at a predetermined position, and which partitions the space 16 of the casing 12 into an oil reservoir chamber 19 and a torque transfer chamber 20; a drive disk 21 which is fixedly supported on the drive shaft 11 while being allowed to be rotatable in the torque transfer chamber 20, and which enables a torque to be transmitted to the casing 12; a valve 22 which opens and closes the oil flow control orifice 18; temperature sensitive means 23, disposed outside the cover 13, for driving the valve 22 in accordance with the temperature of the air; an outer periphery dam 111 which is disposed on an outer periphery side of the drive disk 21 and between the cover 13 and the drive disk 21, in the torque transfer chamber 20; an inner periphery dam 112 which is disposed on an inner periphery side of the drive disk 21, between the casing 12 and the drive disk 21, and in the torque transfer chamber 20; an oil circulating passage 26 which guides oil from the side of the outer periphery dam 111 of the torque transfer chamber 20 to the oil reservoir chamber 19; a seal 27 which is disposed between the drive shaft 11 and the hub 14 with being appropriately outward separated from the needle bearing 71 in the axial direction of the drive shaft 11, and which forms an oil supply chamber 28 defined by these components; and an oil supply passage 113 which guides the oil from the side of the inner periphery dam 112 of the torque transfer chamber 20 to the oil supply chamber 28, in the casing 12.

The outer periphery dam 111 is disposed in the torque transfer chamber 20 so as to be opposed to the drive disk 21, and in the casing 12, and functions at a position where the oil which is guided from the torque transfer chamber 20 to the oil reservoir chamber 19 via the oil circulating passage 26 is pressurized by the drive disk 21.

The inner periphery dam 112 is located in a ring groove 114 which is opened on the side of the inner periphery of the disk face 48 of the drive disk 21, and disposed between the casing 12 and the drive disk 21. In accordance with this, in the oil supply passage 113, an inlet 115 is closer to the side in front of the inner periphery dam 112 in the rotational direction and opened in the torque transfer chamber 20, and an outlet 116 is opened in the oil supply chamber 28 to be opened in the casing 12. As the bearing 15, a sliding bearing is used. It is a matter of course that the sliding bearing 15 may be replaced with the needle bearing 71, the ball bearing 81, or the like.

The components of the temperature sensitive fan drive 110 are designated by the same reference numerals of the temperature sensitive fan drive 10 shown in FIG. 1 and their detailed description is omitted. It is a matter of course that, in the temperature sensitive fan drive 110, part of the oil which is guided from the front side of the outer periphery dam 111 of the torque transfer chamber 20 to the oil reservoir chamber 19 via the oil circulating passage 26 is guided from the front side of the inner periphery dam 112 of the torque transfer chamber 20 to the oil supply chamber 28 via the oil supply passage 113 to forcedly lubricate the sliding bearing 15. More specifically, the inner periphery dam 112 is located closer to the inner periphery of the drive disk 21 than the bearing oil dam 25, and hence the temperature of the air becomes high and the bimetal 23 deflects at a larger degree. In accordance with this, the oil flow control orifice 18 is largely opened by the valve 22, and a large amount of oil is supplied from the oil reservoir chamber 19 to the torque transfer chamber 20 via the oil flow control orifice 18. When a large amount of oil is guided from the front side of the outer periphery dam 111 of the torque transfer chamber 20 to the oil reservoir chamber, part of the oil is guided from the front side of the inner periphery dam 112 of the torque transfer chamber 20 to the oil supply chamber 28 via the oil supply passage 113 to forcedly lubricate the sliding bearing 15. In this way, only when the torque is transmitted from the drive disk 21 to the casing 12, i.e., only when they are coupled to each other, the temperature sensitive fan drive 110 forcedly lubricates the bearing 15. By contrast, the above-described temperature sensitive fan drives 10, 70, 80, 90, and 100 always forcedly lubricate the bearing 15.

As apparent from the specified embodiments of the invention which have been described with reference to the drawings, the person of ordinary skill in the technical field to which the invention belongs can easily embody the subject matter of the invention into other modes which can be objectively recognized to originate in the nature and substance of the invention and involve them. It is a matter of course that the subject matter of the invention is commensurate with the object of the invention and essential in realization of the invention.

(EFFECT)

As understood from the above description, the temperature sensitive fan drive of the invention comprises: a drive shaft which is to be coupled to a pulley shaft of an engine; a casing in which a hub is mounted onto the drive shaft by means of a bearing, which is rotatably supported on the drive shaft, and in which a space is formed by a cover that is mounted under a seal to an opening end; a partition plate in which an oil flow control orifice is opened at a predetermined position, and which partitions the space of the casing into an oil reservoir chamber and a torque transfer chamber; a drive disk which is fixedly supported on the drive shaft while being allowed to be rotatable in the torque transfer chamber, and which enables a torque to be transmitted to the casing; a valve which opens and closes the oil flow control orifice; temperature sensitive means, disposed outside the cover, for driving the valve in accordance with a temperature; an oil recovery dam which is disposed on a side of an outer periphery of the drive disk and in the torque transfer chamber; an oil circulating passage which guides oil from side of an oil recovery dam of the torque transfer chamber to the oil reservoir chamber; a seal which is disposed between the drive shaft and the hub with being appropriately outward separated from the bearing in an axial direction of the drive shaft, and which forms an oil supply chamber defined by these components; and an oil supply passage which guides the oil from the side of the oil recovery dam of the torque transfer chamber to the oil supply chamber. In the temperature sensitive fan drive of the invention, therefore, the drive disk and the casing can ensure a narrow gap between friction faces, the torque is efficiently transmitted, and the torque can be surely transmitted and varied. The bearing can be subjected to forced lubrication serving also as cooling. Seizure of the bearing can be prevented from occurring without being affected by service conditions. The life of the bearing can be ensured so that the bearing can be used for a long term. Various kinds of bearings can be used, and particularly a sliding bearing can be used, whereby the production cost and the size can be reduced. As a result, the invention is very useful and practical in a cooling system of an automobile engine.

Moreover, the temperature sensitive fan drive of the invention comprises: a drive shaft which is to be coupled to a pulley shaft of an engine; a casing in which a hub is mounted onto the drive shaft by means of a bearing, which is rotatably supported on the drive shaft, and in which a space is formed by a cover that is mounted under a seal to an opening end; a partition plate in which an oil flow control orifice is opened at a predetermined position, and which partitions the space of the casing into an oil reservoir chamber and a torque transfer chamber; a drive disk which is fixedly supported on the drive shaft while being allowed to be rotatable in the torque transfer chamber, and which enables a torque to be transmitted to the casing; a valve which opens and closes the oil flow control orifice; temperature sensitive means, disposed outside the cover, for driving the valve in accordance with a temperature; an oil recovery dam which is disposed on a side of an outer periphery of the drive disk and in the torque transfer chamber; an oil circulating passage which guides oil from a side of an oil recovery dam of the torque transfer chamber to the oil reservoir chamber; a seal which is disposed between the drive shaft and the hub with being appropriately outward separated from the bearing in an axial direction of the drive shaft, and which forms an oil supply chamber defined by these components; an oil supply passage which guides the oil from the side of the oil recovery dam of the torque transfer chamber to the oil supply chamber; a bypass which allows the oil to escape from an intermediate portion of the oil supply passage to the torque transfer chamber; and a relief valve which is disposed in the portion of the oil supply passage from which the bypass branches off. In the temperature sensitive fan drive of the invention, therefore, the drive disk and the casing can ensure a narrow gap between friction faces, the torque is efficiently transmitted, and the torque can be surely transmitted and varied. The bearing can be subjected to forced lubrication serving also as cooling. Seizure of the bearing can be prevented from occurring without being affected by service conditions. The life of the bearing can be ensured so that the bearing can be used for a long term. When the pressure of the oil supplied to the oil supply chamber exceeds a preset value, the relief valve allows part or all of the oil to escape into the torque transfer chamber via the bypass, whereby excessive forced lubrication of the bearing is suppressed and the seal is hence protected. Various kinds of bearings can be used, and particularly a sliding bearing can be used, whereby the production cost and the size can be reduced. As a result, the invention is very useful and practical in a cooling system of an automobile engine.

Furthermore, the temperature sensitive fan drive of the invention comprises: a drive shaft which is to be coupled to a pulley shaft of an engine; a casing in which a hub is mounted onto the drive shaft by means of a bearing, which is rotatably supported on the drive shaft, and in which a space is formed by a cover that is mounted under a seal to an opening end; a partition plate in which an oil flow control orifice is opened at a predetermined position, and which partitions the space of the casing into an oil reservoir chamber and a torque transfer chamber; a drive disk which is fixedly supported on the drive shaft while being allowed to be rotatable in the torque transfer chamber, and which enables a torque to be transmitted to the casing; a valve which opens and closes the oil flow control orifice; temperature sensitive means, disposed outside the cover, for driving the valve in accordance with a temperature; an oil recovery dam which is disposed on a side of an outer periphery of the drive disk and in the torque transfer chamber; an oil circulating passage which guides oil from a side of an oil recovery dam of the torque transfer chamber to the oil reservoir chamber; a seal which is disposed between the drive shaft and the hub with being appropriately outward separated from the bearing in an axial direction of the drive shaft, and which forms an oil supply chamber defined by these components; an oil supply passage which guides the oil from the side of the oil recovery dam of the torque transfer chamber to the oil supply chamber; and a restriction disposed in the oil supply passage. In the temperature sensitive fan drive of the invention, therefore, the drive disk and the casing can ensure a narrow gap between friction faces, the torque is efficiently transmitted, and the torque can be surely transmitted and varied. The bearing can be subjected to forced lubrication serving also as cooling. Seizure of the bearing can be prevented from occurring without being affected by service conditions. The life of the bearing can be ensured so that the bearing can be used for a long term. When the pressure of the oil supplied to the oil supply chamber becomes high, the restriction adjusts the oil, whereby the oil which excessively flows into the oil supply chamber is suppressed. In accordance with this, excessive forced lubrication of the bearing is suppressed and the seal is hence protected. Various kinds of bearings can be used, and particularly a sliding bearing can be used, whereby the production cost and the size can be reduced. As a result, the invention is very useful and practical in a cooling system of an automobile engine.

Furthermore, the temperature sensitive fan drive of the invention comprises: a drive shaft which is to be coupled to a pulley shaft of an engine; a casing in which a hub is mounted onto the drive shaft by means of a bearing, which is rotatably supported on the drive shaft, and in which a space is formed by a cover that is mounted under a seal to an opening end; a partition plate in which an oil flow control orifice is opened at a predetermined position, and which partitions the space of the casing into an oil reservoir chamber and a torque transfer chamber; a drive disk which is fixedly supported on the drive shaft while being allowed to be rotatable in the torque transfer chamber, and which enables a torque to be transmitted to the casing; a valve which opens and closes the oil flow control orifice; temperature sensitive means, disposed outside the cover, for driving the valve in accordance with a temperature; an outer periphery oil recovery dam which is disposed on an outer periphery of the drive disk in the torque transfer chamber and in the casing; an inner periphery oil recovery dam which is disposed on an inner periphery side of the drive disk, between the casing and the drive disk, and in the torque transfer chamber; an oil circulating passage which guides oil from a side of an oil recovery dam of the torque transfer chamber to the oil reservoir chamber; a seal which is disposed between the drive shaft and the hub with being appropriately outward separated from the bearing in an axial direction of the drive shaft, and which forms an oil supply chamber defined by these components; and an oil supply passage which guides the oil from the side of the oil recovery dam of the torque transfer chamber to the oil supply chamber. In the temperature sensitive fan drive of the invention, therefore, the drive disk and the casing can ensure a narrow gap between friction faces, the torque is efficiently transmitted, and the torque can be surely transmitted and varied. The bearing can be subjected to forced lubrication serving also as cooling. Seizure of the bearing can be prevented from occurring without being affected by service conditions. The life of the bearing can be ensured so that the bearing can be used for a long term. Various kinds of bearings can be used, and particularly a sliding bearing can be used, whereby the production cost and the size can be reduced. As a result, the invention is very useful and practical in a cooling system of an automobile engine.

What is claimed is:

1. A temperature sensitive fan drive comprising:
   a drive shaft (11) coupled to a pulley shaft of an engine;
   a casing (12) having a hub portion (14) rotatably supported on said drive shaft (11);
   a bearing (15) disposed between said drive shaft (11) and said casing (12) for rotatably supporting said hub portion (14) relative to said drive shaft (11);
   a cover (13) sealingly attached to an opening end of said casing (12) so as to define a space (19) therebetween;
   a partition plate (17) for partitioning said space into an oil reservoir chamber and a torque transfer chamber, said partition plate having an oil flow control orifice (18) for communicating said oil reservoir chamber with said torque transfer chamber;
   a drive disk (21), fixedly supported on said drive shaft and allowed to rotate within said torque transfer chamber, for transmitting a torque from said drive shaft to said casing (12);

a valve plate (22) fixedly mounted on said drive disk for opening and closing said oil flow control orifice;

temperature sensitive member (23) being deflectable in accordance with an ambient temperature prevailing around the fan drive and being provided on the outside of said cover for driving said valve plate through a deflection thereof;

an oil circulating passage (26) provided in said cover (13) for communicating said torque transfer chamber with said oil reservoir chamber;

first oil recovery dam (24) disposed within said torque transfer chamber in adjacent to an outer periphery of said drive disk for guiding an oil within said torque transfer chamber to an opened end of said oil circulating passage;

a sealing member (27) disposed between said drive shaft and said hub and mounted to one of said drive shaft and said hub at a position apart from said bearing in an axial direction of said drive shaft so as to define an oil supply chamber between said sealing member and said bearing;

an oil supply passage (29) provided in said casing (12) for communicating said torque transfer chamber with said oil supply chamber; and a second oil recovery dam (25) disposed within said torque transfer chamber in adjacent to an outer periphery of said drive disk for guiding an oil within said torque transfer chamber to an opened end of said oil supply chamber.

2. The temperature sensitive fan drive according to claim 1, wherein said bearing is selected from the group essentially consisting of a sliding bearing, a needle bearing and a ball bearing.

3. The temperature sensitive fan drive according to claim 2, further comprising:

a bypass passage (91) escapable the oil from an intermediate portion of said oil supply passage to said torque transfer chamber; and a relief valve (92) disposed in said intermediate portion of said oil supply passage from which said bypass branches off.

4. The temperature sensitive fan drive according to claim 2, wherein said disk drive has an outer peripheral surface which is coated with a wear-resistant material.

5. The temperature sensitive fan drive according to claim 2, wherein said disk drive has an outer peripherial surface to which a facing is attached.

6. The temperature sensitive fan drive according to claim 2, further comprising:

a restriction deposited in said oil supply passage for restricting an oil rate.

7. The temperature sensitive fan drive according to claim 2, wherein said restriction is one of a constant restriction and a variable restriction.

8. The temperature sensitive fan drive according to claim 2, wherein said second oil recovery dam is deposited at a position radially closer to a rotation axis of said drive shaft than a position on which said first oil recovery dam is deposited.

9. The temperature sensitive fan drive according to claim 1, further comprising:

a bypass passage (91) escapable the oil from an intermediate portion of said oil supply passage to said torque transfer chamber; and a relief valve (92) disposed in said intermediate portion of said oil supply passage from which said bypass branches off.

10. The temperature sensitive fan drive according to claim 1, wherein said disk drive has an outer peripherial surface which is coated with a wear-resistant material.

11. The temperature sensitive fan drive according to claim 1, wherein said drive disk has an outer peripherial surface to which a facing is attached.

12. The temperature sensitive fan drive according to claim 1, further comprising:

a restriction disposed in said oil supply passage for restricting an oil rate.

13. The temperature sensitive fan drive according to claim 1, wherein said restriction is one of a constant restriction and a variable restriction.

14. The temperature sensitive fan drive according to claim 1, wherein said second oil recovery dam is deposited at a position radially closer to a rotation axis of said drive shaft than a position on which said first oil recovery dam is deposited.

* * * * *